United States Patent [19]
Lee

[11] Patent Number: 5,881,256
[45] Date of Patent: Mar. 9, 1999

[54] BUS INTERFACE UNIT CAPABLE OF SIMULTANEOUSLY PROCEEDING WITH TWO BUS CYCLES IN A HIGH-PERFORMANCE MICROPROCESSOR

[75] Inventor: Suk Joong Lee, Kyoungki-do, Rep. of Korea

[73] Assignee: Hyundai Electronics Industries Co., Ltd., Ichon-shi, Rep. of Korea

[21] Appl. No.: 965,764

[22] Filed: Nov. 7, 1997

[30] Foreign Application Priority Data

Nov. 7, 1996 [KR] Rep. of Korea .................. 1996 52657

[51] Int. Cl.[6] ...................................................... G06F 13/14
[52] U.S. Cl. .................... 395/309; 395/872; 395/800.23; 395/800.38; 395/200.64; 395/391; 395/821
[58] Field of Search ...................................... 395/309, 872, 395/800.23, 800.38, 200.64, 391, 821

[56] References Cited

U.S. PATENT DOCUMENTS 5,398,244  3/1995  Mathews et al. .
5,574,937  11/1996  Narain .

OTHER PUBLICATIONS

Iacobovici et al., "Balanced Microprocessor Design Keeps Performance Peaked", IEEE, 1989, pp. 371–375.

*Primary Examiner*—Larry D. Donaghue
*Assistant Examiner*—John Follansbee
*Attorney, Agent, or Firm*—Jacobson, Price, Holman & Stern, PLLC

[57] ABSTRACT

A bus interface unit of a microprocessor which can simultaneously process bus cycle's requests coming from various pipelines during for one cycle in the pipelined high-performance microprocessor of a superscalar type. The bus interface unit includes a bus cycle arbiter for arbitrating a plurality of cycle requests inputted from a plurality of units, a cycle multiplexer for selecting cycle information inputted from the units in response to an arbitration determination of the bus cycle arbiter, a cycle queue for storing selected information, a cycle generator for generating a bus cycle in response to the information stored in the cycle queue, a bus controller for controlling the bus interface unit as a whole, and a write buffer for enabling a next operation without waiting for the core unit to complete its write operation to improve a performance of a memory write cycle. According to the bus interface unit, the bus cycle requests from respective pipelines of the microprocessor are simultaneously processed during one cycle.

12 Claims, 4 Drawing Sheets

BUS INTERFACE UNIT CAPABLE OF SIMULTANEOUSLY PROCEEDING WITH TWO BUS CYCLES IN A HIGH-PERFORMANCE MICROPROCESSOR

BACKGROUND OF THE INVENTION

1. Field of the Invention

The present invention relates generally to a microprocessor and, more particularly, to a bus interface unit which can simultaneously proceed with two bus cycles as one among internal units in a high-performance microprocessor.

2. Description of the Prior Art

With the improvement of the microprocessor's performance caused by the development of semiconductor design and fabrication techniques, an internal core unit has been rapidly developed. However, peripheral units communicating with the internal core through a bus have been developed relatively slow due to their inherent specialty (since the speed of a semiconductor memory is much slower than that of a microprocessor, a great loss of cycle is produced even by one access of the memory though the internal execution is proceeding very quickly.). Accordingly, the importance of the bus interface unit for interfacing them has been extended. Specifically, in case of a microprocessor adopting a superscalar type wherein a plurality of execution units are provided so as to simultaneously execute a plurality of instructions, or adopting a super-pipeline type wherein a typical pipeline is subdivided, a large number of bus activities are required in comparison to a conventional microprocessor, and thus it is required to simultaneously process requests of respective bus cycles which are requested from respective pipelines during one cycle.

As a result, in order to satisfy the speed difference between the internal core and the peripheral units and the necessity of plentiful bus operations required in the superscalar structure, the bus interface unit which is an interface block between them should be improved.

SUMMARY OF THE INVENTION

It is an object of the present invention to solve the problems involved in the related art, and to provide a bus interface unit of a microprocessor which can simultaneously process bus cycle's requests coming from various pipelines during one cycle in a pipeline high-performance microprocessor of a superscalar type.

In order to achieve the above object, there is provided a bus interface unit of a pipeline microprocessor of a superscalar type including a core unit having an internal processing unit, a code cache, and a data cache, and the bus interface unit for interfacing the core unit with a plurality of peripheral units, the bus interface unit comprising: bus cycle arbiter means for arbitrating a plurality of cycle requests inputted from the plurality of units; cycle information selecting means for selecting cycle information inputted from the units in response to an arbitration determination of the bus cycle arbiter means; a cycle queue for storing selected information; cycle generating means for generating a bus cycle in response to the information stored in the cycle queue; bus control means for controlling the bus interface unit as a whole; and a write buffer for enabling a next operation without waiting for the core unit to complete its write operation to improve a performance of a memory write cycle, wherein the bus interface unit simultaneously processes the bus cycle requests from respective pipelines of the microprocessor during one cycle.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENTS

According to a preferred embodiment of the present invention, a bus interface unit of a high-performance microprocessor having two (i.e., X-pipe and Y-pipe) parallel pipeline structure such as a Pentium of the Intel microprocessor series.

The bus cycle in the Pentium compatible microprocessor is briefly classified into seven kinds.

That is, an 'interrupt acknowledge cycle' for bring an interrupt vector with respect to an external interrupt, a 'special cycle' for informing that the internal core unit executes a specified instruction or is in a specified state, I/O (input/output) read cycle and I/O write cycle for performing read and write operations for I/O units, memory read cycle and memory write cycle for reading and writing data in a memory, and a code read cycle for reading an instruction from the memory in distinction from the data. Among these cycles, the memory-related cycles enable the burst operation of read and write under various conditions.

Figure 1:
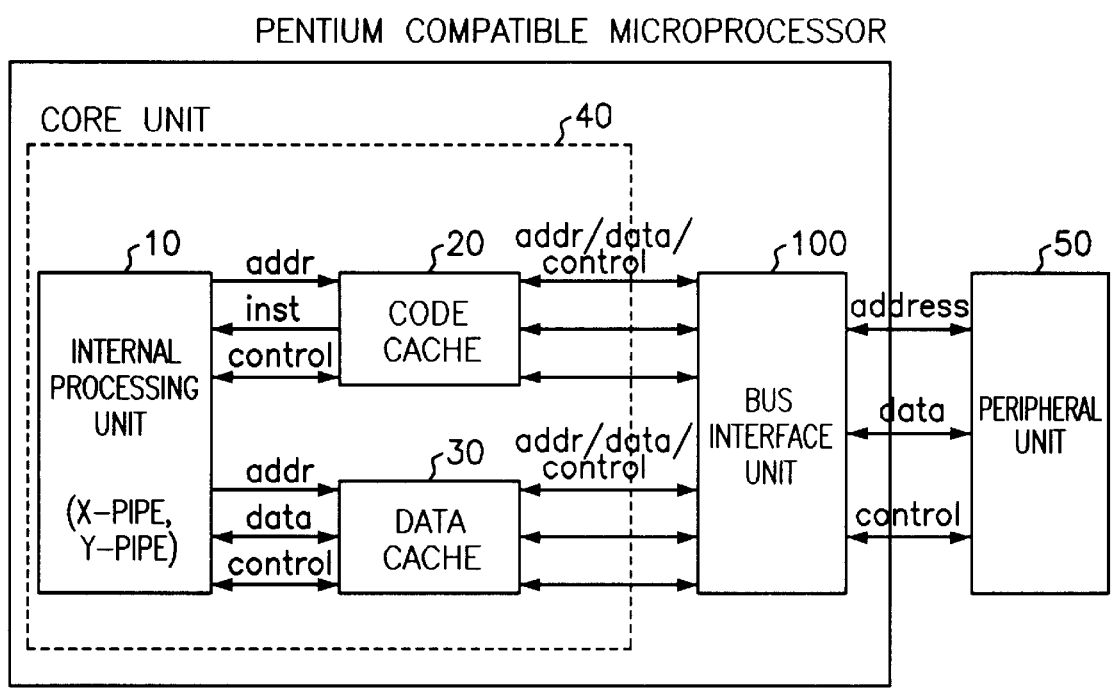
FIG. 1 is a block diagram of a pentium compatible microprocessor including a bus interface unit.

FIG. 1 is a system block diagram showing the role of the bus interface unit of a Pentium compatible microprocessor. In FIG. 1, the reference numeral 40 denotes a core unit in the Pentium compatible microprocessor, 10 denotes an internal processing unit of the processor, 20 denotes a code cache, 30 denotes a data cache, and 50 denotes a peripheral unit.

If the internal processing unit 10 intends to proceed with the cycle for the peripheral unit 50 such as a memory, I/O unit, disk, etc. as it executes the instruction through its two pipelines, i.e., X-pipeline and Y-pipeline, it requests the cycle through the data cache 30, or requests the cycle through the code cache 20 so as to bring the instruction to be executed in the respective pipeline. Accordingly, various cycle requests can pass from the core unit 40 to the bus.

As a result, the code cache 20 is limited to bring the requests for the bus cycle and the instruction, and the data 30 is limited to bring the remaining cycle requests, resulting in that the protocol related to the request and the proceed of the bus cycle between the bus interface unit and other units becomes plain.

Also, the bus interface unit 100 receives and transfers the data coming from the external system (i.e., the peripheral unit) to the respective caches, and receives and transfers the snoop-related requests coming from the external unit to the data cache 30 and the code cache 20, so that the consistency of the cache data is guaranteed. As the internally coming information, there exist a BOFF# signal for floating all the buses to escape from a deadlock, a HOLD signal provided from a DMA (direct memory access) unit for floating all the buses after the proceeding bus cycle is completed, and an AHOLD signal for floating only an address bus for proceeding a snoop cycle. Also, there exists an NA# signal for informing that the bus cycle is available as an important signal related to the bus cycle pipeline. Here, '#' represents low-active.

Figure 2:
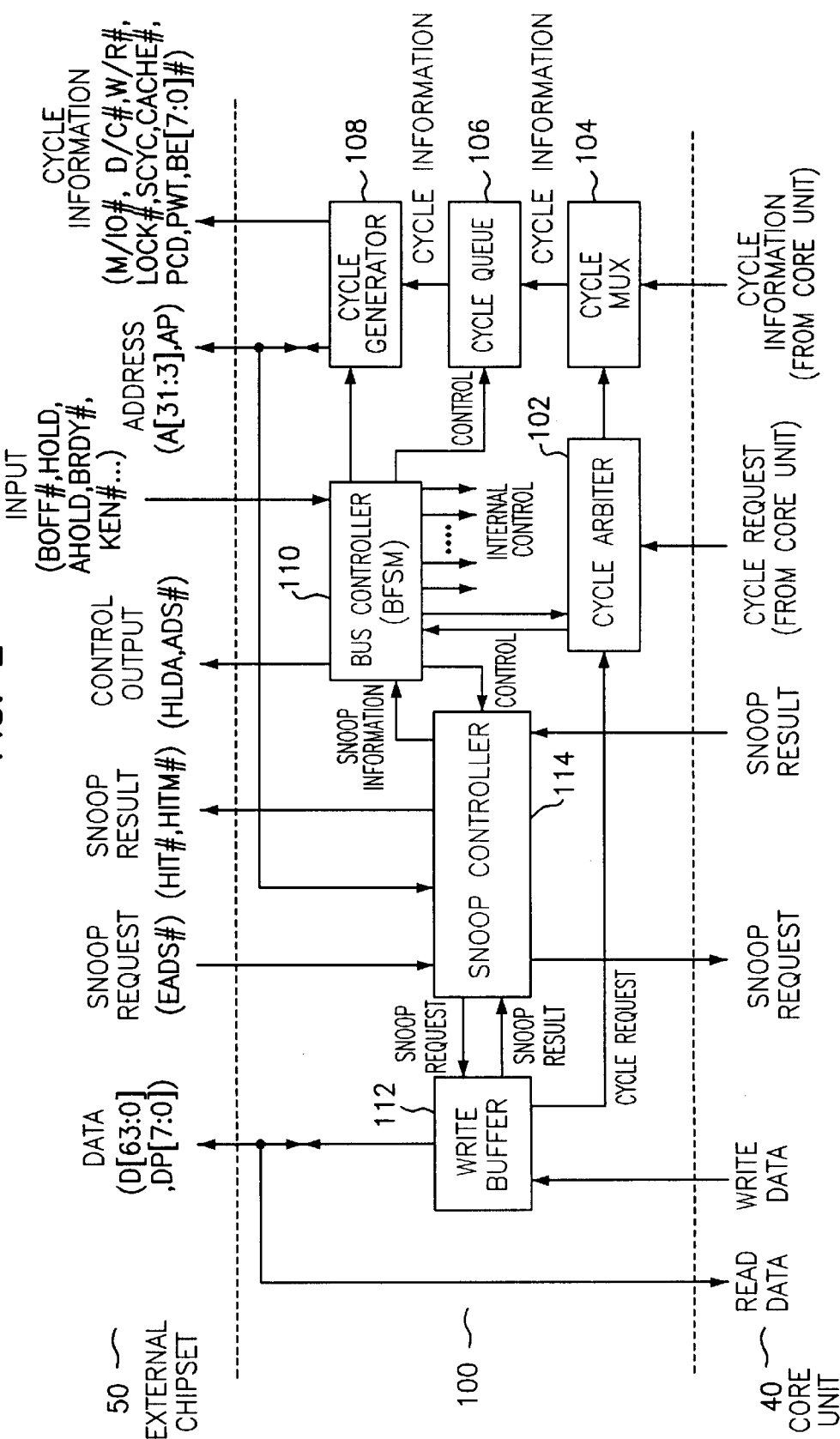
FIG. 2 is a block diagram of the bus interface unit according to the present invention.

FIG. 2 is a block diagram of the bus interface unit according to the present invention. In FIG. 2, the reference numeral 102 denotes a cycle arbiter for arbitrating a plurality of cycle requests coming from a plurality of units so as to simultaneously process the bus cycle requests coming from the respective pipelines, 104 denotes a cycle multiplexer for selecting cycle information coming from the core unit 40 in accordance with a signal determined by the cycle arbiter 102, 106 denotes a cycle queue for storing the selected information up to two, 108 denotes a cycle generator for generating a bus cycle in accordance with the cycle queue information, 110 denotes a bus controller for controlling all the blocks as described above, 112 denotes a write buffer for enabling a next operation without waiting for the core unit 40 to complete its write operation to improve the performance of a memory write cycle, and 114 denotes a snoop controller in charge of snooping for the internal caches to maintain the consistency of the internal cache data in the high-performance microprocessor using a write back cache.

The bus controller 110 receives signals coming from the core unit 40, external peripheral unit 50, and bus interface unit 100, and controls the whole operation of the bus interface unit. Specifically, the bus controller 110 controls the bus interface unit using a finite state machine having six states in accordance with the proceeding of the cycle. Referring to FIG. 2, it appears that each external pin of the processor can proceed with one cycle. However, if a next bus cycle is to proceed after waiting until the previously processed bus cycle is completed, the bus interface unit will be the bottleneck of the whole system. Thus, in order to simultaneously proceed with the two cycles under such hardware limitations, the concept of pipelining is introduced in the bus cycle, and a block for controlling the pipeline is employed. The bus controller 110 takes charge of such a control operation.

In case of the Pentium processor, unlike 386/486 processors, two bus cycles are pipeline and processed. Specifically, if there exists a waiting cycle when the NA# signal coming from the external peripheral unit is received, the new cycle can be processed even though the previously processed cycle has not yet been completed, as shown in FIG. 3.

Figure 3:
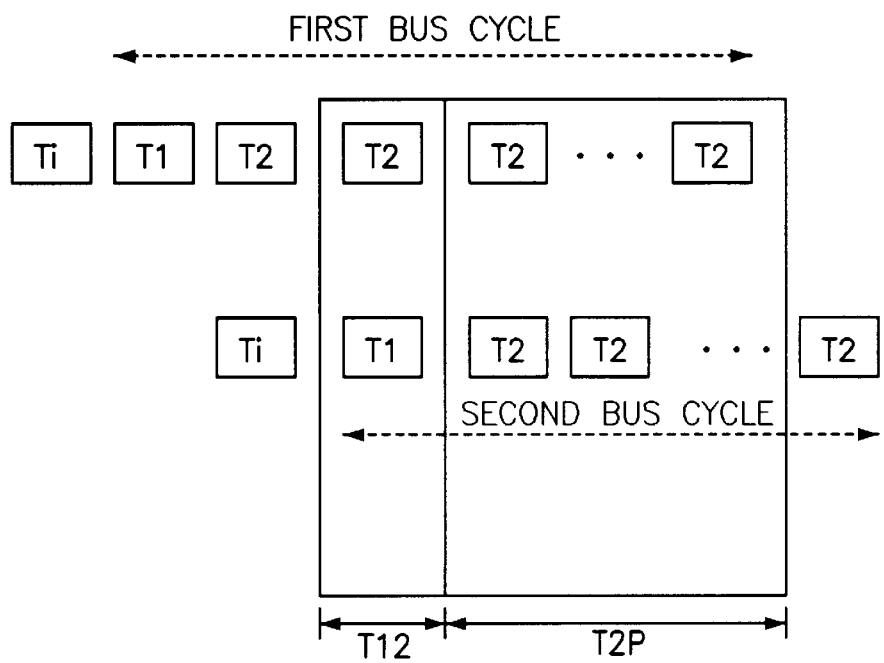
FIG. 3 is a view illustrating conceptually a bus cycle pipelining for each pipeline.

FIG. 3 is a view explaining the bus cycle pipelining of a Pentium processor. In FIG. 3, 'Ti' represents the state where the cycle is not currently processed on the bus. In this case, whenever any cycle request comes from the core unit to the cycle arbiter 102, the new bus cycle can start to proceed. 'T1' represents the stage for externally producing an address and a cycle control signal for the cycle to proceed, and 'T2' represents the state where the data is actually transferred or where the data is waiting for its transfer.

By introducing the pipeline concept hereto, additional three states are produced as shown in FIG. 3.

First, a 'T12' state is produced so that a new second bus cycle goes to 'T2' while the previously processed first bus cycle is in the 'T2' state. Second, a 'T2P' state is produced when the two 'T 2's are processed in parallel, i.e., when the first bus cycle has not yet been completed and is in the 'T2' state, and the second bus cycle is in the 'T2' state. Third, a 'Td' state is produced if it is required that the data bus drive is discontinued for at least one cycle, in case that the first bus cycle and the second bus cycle intend to transfer data in different directions from each other in the data bus, i.e., if the first and second bus cycles are a read cycle and a write cycle, respectively.

The bus cycle arbiter 102 is a block in charge of arbitration of the bus cycle requests coming from the various units. If the cycle requests simultaneously come from the various units, the bus cycle arbiter 102 sends to the respective units the cycle acknowledge signals in accordance with a fixed priority algorithm. The arbitration priority is given as follows:

The first priority is given to a write back buffer (In the data cache of the Pentium compatible processor are three write back buffers, whose priority orders are given as external snoop write back buffer>internal snoop write back buffer>replacement write back buffer).

The second priority is given to the cycle queue (a request for the cycle discontinued by the BOFF# signal or for the second one of the misaligned cycles).

The third priority is given to the write buffer (One write buffer exists in each of the X-pipe and the Y-pipe of the Pentium compatible processor. In case of the simultaneous write, the buffer in the X-pipe has a higher priority, and otherwise, the priority is given in the written order of them).

The fourth priority is given to the data cache ( all cycles except for the instruction read request the bus cycle to the data cache.).

The fifth priority is given to the code cache (a request for the instruction prefetch).

The cycle multiplexer 104 selects a block acknowledged by the cycle arbiter 104 to proceed with the cycle or information on the cycle from the unit (an address, a size of the operand, the kind of the cycle, whether or not to proceed with a locked cycle, etc.) so as to store the selected information in the cycle queue 106.

The cycle queue 106 stores therein cycle information determined by the cycle multiplexer 104. The cycle queue 106 comprises two entries so as to enable two cycles at maximum to proceed simultaneously. The cycle queue 106 acts an important role in proceeding two cycles in parallel along with the bus controller 110 and the cycle arbiter 102. Also, the cycle queue 106 is used for the restart of the cycle in case that the cycle is discontinued by the BOFF# signal coming from the external peripheral unit, as well as for producing two aligned cycles in the bus unit in case of the misaligned cycle which lies on the boundary of the data bus.

Figure 4:
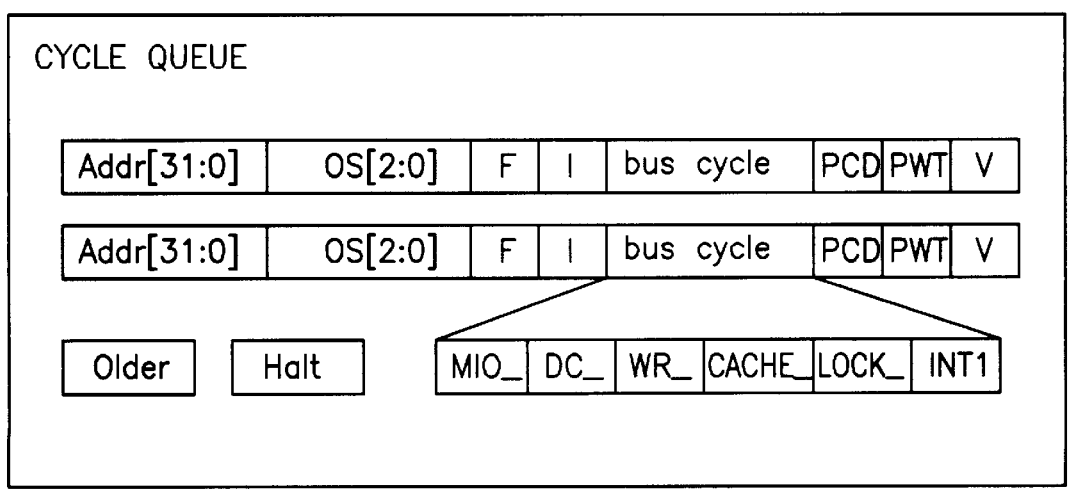
FIG. 4 is a view illustrating the internal structure of the cycle queue according to the present invention.

FIG. 4 is a view showing the internal structure of the cycle queue according to the present invention, wherein the contents allocated to the respective two entries are illustrated. In FIG. 4, the meanings of the respective parts are as follows:

Older: a kind of flag indicating one of the two entries of the cycle queue which should be first processed.

Halt: a part indicating that a cycle discontinued by the backoff condition exists by activating the BOFF# pin by the external peripheral unit. If this bit is in a set state in case that the backoff condition is gone, the cycle stored in the cycle queue is processed with the highest priority.

Addr: an address of the cycle to be processed. Though only upper 29 bits of the address actually go out, all the 32 bits of the address are stored to produce a byte enable signal.

OS: the operand size of the cycle to be processed.

F: This indicates the first cycle of the misaligned cycles. In case of the misaligned cycles, the bus interface unit produces two bus cycles with respect to one cycle request, and F represents that the first one of the two cycles is now processed.

I: a part indicating the cycle lying on the boundary of the bus unit.

bus cycle: a part indicating the kind of cycle to be processed. It is composed of six bits in all.

PCD, PWD: a part for controlling an external cache in case that the external cache is used.

V: a valid bit indicating whether or not valid data exists in the cycle queue.

The firstly written one of the two entries, i.e., the cycle to be firstly processed, is indicated by utilizing Older. For convenience' sake, the two entries are named FQueue and BQueue. If Older is "1", the cycle is firstly written in FQueue, while if Older is "0", the cycle is firstly written in BQueue.

A new cycle is stored in the cycle queue as follows:

If the new cycle starts under the condition that the queue is empty, information related to the new cycle is unconditionally written in FQueue, Older indicates FQueue, and V (the valid bit) of FQueue is set. In order to simultaneously proceed with the two cycles in the state that the queue is occupied, the new cycle is stored in the other entry which is not indicated by Older, and the valid bit of the entry is set. If the two entries are occupied, a new cycle cannot be received any more.

In case that the proceeding cycle is completed, the following is performed.

If the cycle is stored in both the two entries, the valid bit of the entry indicated by Older is cleared, and then Older is toggled, so that it indicates that the other entry, which is not the one wherein the cycle has just been completed, becomes the cycle to be processed first. If the cycle is stored only in one entry, the valid bit of the corresponding entry is cleared, and then Older is toggled. At this time, the toggling of Older has no meaning, but it provides an advantage in implementing the circuitry.

In case that the backoff is produced during the proceeding of the cycle, it is discontinued, and the Halt bit is set. If the backoff condition is gone, the Halt bit is cleared after all the cycles remaining in the cycle queue are processed.

Two cases exist in proceeding with a new cycle through the cycle queue. First, in case that a proceeding cycle exists when the backoff condition is produced as described above, the Halt bit is set to indicate the existence of the discontinued cycle.

Thereafter, if the backoff condition is gone, the bus controller 110 checks whether the Halt bit is set, and it sends a control signal to the cycle arbiter 102 if the Halt bit is set. The cycle arbiter 102 receives the control signal and processes the request from the cycle queue 106 with the highest priority. Second, if the cycle lies on the boundary of the data bus and it cannot be processed as one cycle, i.e., if the 'F' and 'I' bits are set, it means that the current proceeding cycle is the first cycle of the misaligned cycles, and the bus controller 110 sends a signal to the cycle arbiter 102 to proceed with a next cycle. The cycle arbiter 102 also processes this request with the highest priority. Thereafter, in case of the second cycle processed as above, the 'F' bit is cleared to indicate that the second cycle of the misaligned cycles is now proceeding.

The cycle generator 108 generates cycle-related signals to mate with the bus protocol, based on the information stored in the cycle queue 106. The cycle-related signals are an A[31:3] signal which is the address of the current bus cycle, a BE[7:0]# signal indicating a valid byte in the data bus, M/IO#, D/C#, and W/R# signals indicating the kind of the bus cycle, a CACHE# signal indicating the length of the cycle, LOCK# and SCYC signals related to a locked cycle, and signals for driving PCD and PWT pins related to the control of an external cache.

The snoop controller 114 performs a snoop operation for checking the internal caches by externally receiving their addresses to guarantee the consistency of the cache data in a processor using internal caches. In case of the Pentium compatible processor, the snoop operation is performed in such a manner that the address bus is floated utilizing the AHOLD, HOLD, and BOFF# pins, and a snoop address is provided with the EADS# signal to check the result. If a hit is generated on the modified line, the write back cycle is accompanied.

As a snoop address, upper 27 bits of the whole address bus, which ends at A[31:5], are received, and lower 5 bits thereof will not be used since the size of the cache line is 32 bytes. This address is sent to the data cache, code cache, and write buffers in the bus unit to request the snoop operation. Also, the snoop controller receives the snoop results from the respective units, and informs them externally.

Figure 5:
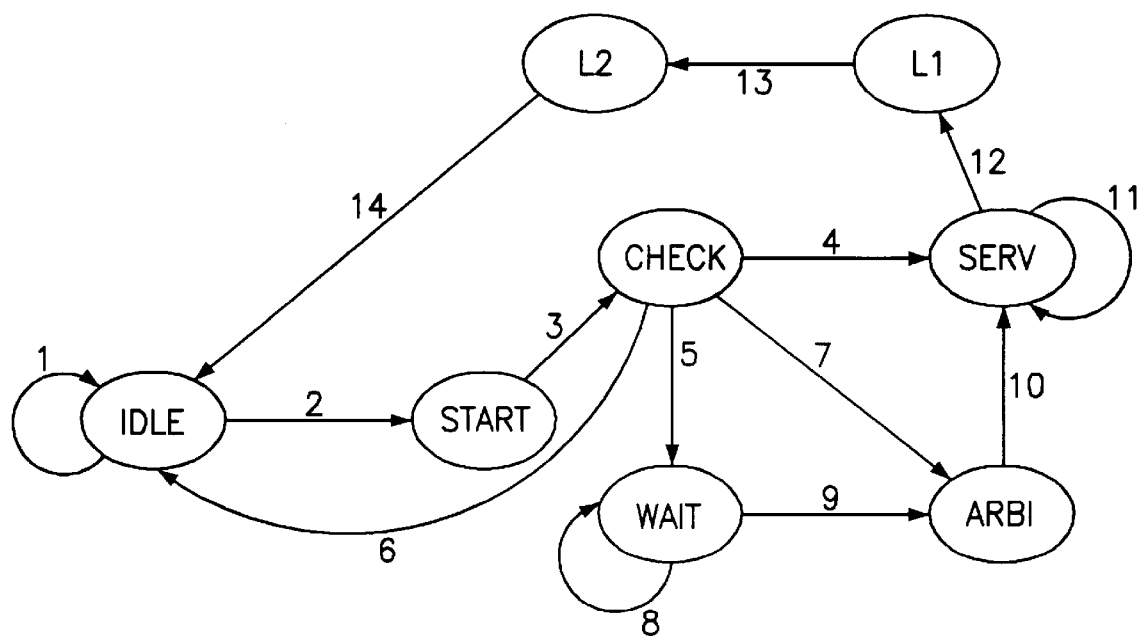
FIG. 5 is a state diagram of a state machine for processing a snoop cycle.

The snoop controller 114 controls the snoop-related operations as described above using a state machine so called "SnpFSM". FIG. 5 is a state diagram of the state machine for processing the snoop cycle. Referring to FIG. 5, the contents of the respective states are as follows:

IDLE: a state where no operation related to the snoop exists.

START: a state where externally inputted snoop requests are sent to the internal units and their results are received.

CHECK: a state where a next operation is determined in accordance with the latched snoop results.

WAIT: a state where a snoop hit for a modified line in the data cache is generated, but another bus cycle is now proceeding, or where the write back cycle cannot be processed by the backoff or the bus hold.

ARBI: a state where arbitration is performed as the write back cycle can be processed.

SERV: a state where the write back cycle is now proceeding.

L1: a state after the final BRDY# signal is received.

L2: a state after two clocks are passed after receiving the final BRDY# signal.

In the states of SnpFSM, "1" represents the state where IDLE is continued since no snoop-related operation is performed, "2" represents the state where a request for the start of the snoop cycle is received from an external peripheral unit and IDLE is changed to START, and "3" represents the state where if the snoop signal is received, a request for the start of snoop is sent to the respective units and then the snoop result is received and checked. "4" represents the state where the hit is generated with respect to the modified line in the data cache, and the write back cycle for the line in which the hit is generated is now proceeding. "5" represents the state where the hit is generated with respect to the modified line, and the proceeding of the write back cycle is waited for since the present state is the backoff or bus hold state in which another bus cycle is now proceeding. "6" represents the state where if the hit is not generated for the modified line (i.e., a snoop miss is generated on the exclusive or modified line), a parity error is generated as a result of the parity check for the snoop address. In this state, the write back cycle is not accompanied. "7" represents the state where no proceeding bus cycle exists, and the hit is generated for the modified line. In this state, the write back cycle starts to proceed through the arbitration process. "8" is identical to "5". "9" represents the state where the proceeding cycle is completed, or the BOFF# or HLDA pin is deserted. In this state, the write back cycle starts to proceed through the arbitration process. "10" represents the state where the cycle starts to proceed through the arbitration process, and "11" represents the state where the write back cycle is proceeding. "12" represents the state where the final BRDY# signal is inputted, and "13" represents the state where it is required to wait for one cycle by the protocol. "14" represent the state for informing the peripheral unit and the internal core that the write back cycle by the snoop heat is completed.

The write buffer 112 having the size of 64 bits is provided in each pipeline, i.e., X-pipe and Y-pipe, to improve the performance under the condition that the write operation is consecutively requested in both pipelines. The write buffer is used to externally proceed with the cycle if the write miss is generated for the internal cache, or the write it is generated on the line shared for the cache coherency.

By using the write buffer, a next operation of the core unit can be performed without waiting for the write cycle to write in the memory, thereby greatly improving the performance.

Figure 6:
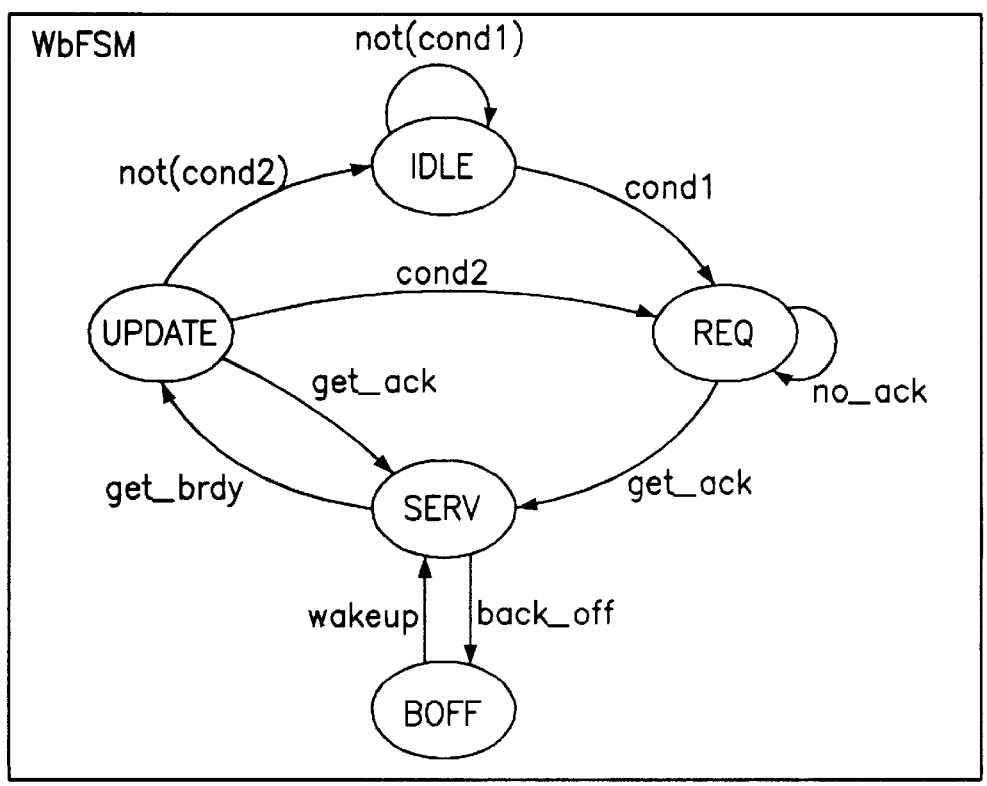
FIG. 6 is a state diagram of a state machine for a write buffer.

If the data is written in the write buffer, the bus unit externally proceeds with the memory write cycle through the arbitration process. The whole control related to the write buffer is performed by a state machine so called "WbFSM". FIG. 6 is a state diagram of the state machine for the write buffer. The write buffer is composed of five states, the meanings of which are as follows:

IDLE: a state where the write buffer is empty and thus available for the write operation if the write miss or the write hit for the shared line is generated in the core unit.

REQ: a state where the memory write is stored in the write buffer. In this state, a cycle request signal is continuously sent to the cycle arbiter 102 to obtain the bus cycle, and it goes to a SERV state if the cycle acknowledge signal is received.

SERV: a state where the write waiting in the write buffer is externally processed.

BOFF: a state where the proceeding write cycle is discontinued by externally activating the BOFF# signal. In this state, if a wakeup signal for re-proceeding with the cycle is received by inactivating the BOFF# signal in the cycle queue 106, it goes to the SERV state.

UPDATE: a state where if the write buffer is stored because of the write hit for the shared line, the state of the corresponding cache line is changed to an E (exclusive) or S (shared) state in accordance with the sampled value of the WB/WT# pin after the completion of the write cycle, and the result of the cache line change is informed to the data cache.

The write buffer block plays a role of a temporary buffer for the write cycle. Thus, it receives and sends signals with the data cache, and it is internally connected to the cycle queue.

Finally, the operation of the whole blocks for simultaneously proceeding with two cycles according to the embodiment of the present invention will be explained.

It is assumed one situation that data should be written in the memory and the other situation that an instruction should be read to consecutively perform a next instruction are simultaneously produced. At this time, the cache miss is simultaneously generated in both the data cache and the code cache.

First, since it is the memory write cycle, the data is written in the write buffer, and the write buffer 112 requests a cycle to the cycle arbiter 102, causing two cycle request signal to be inputted to the cycle arbiter 102. Since the request from the write buffer 112 has a higher priority, the cycle arbiter 102 provides a cycle acknowledge signal to the write cycle of the memory. The cycle multiplexer 104 firstly stores the data cache cycle in the cycle queue 106 since the cycle acknowledge is given to the data cache. At this time, the bus controller 110 sends a signal for proceeding with the stored cycle to the cycle generator 108, and thus the cycle generator 108 firstly proceeds with the memory write cycle in accordance with the information stored in the queue.

On the other hand, if the NA# signal for enabling the two cycles to proceed is received from the peripheral unit, the cycle arbiter 102 gives an acknowledge signal to the cycle for reading the instruction. Thereafter, the cycle is stored in the queue, and then is processed under the control of the bus controller.

If the BOFF# signal for discontinuing the cycle is received during the above-described procedure, the cycle is immediately stopped, and since the two cycles in the queue are stopped, the Halt bit is set to maintain the discontinued state. If the backoff condition is gone, the discontinued two cycles start to proceed in order.

The present invention provides a bus unit suitable for a high-performance microprocessor, and especially for the Intel Pentium compatible processor.

However, the bus units of all the microprocessors perform communication in accordance with their own bus protocols, and thus they can be used as the bus interface units of other high-performance microprocessors if the parts related to the peripheral units such as the cycle generator, bus controller, etc., are modified.

As described above, the internal bus interface unit of a pipelined high-performance microprocessor of a superscalar type according to the present invention can simultaneously process the bus cycle's requests coming from the respective pipelines during one cycle, thereby improving the overall processing capability of the microprocessor.

While the present invention has been described and illustrated herein with reference to the preferred embodiment thereof, it will be understood by those skilled in the art that various changes in form and details may be made therein without departing from the spirit and scope of the invention.

What is claimed is:

1. A bus interface unit of a pipelined microprocessor of a superscalar type including a core unit having an internal processing unit, a code cache, and a data cache, and said bus interface unit for interfacing said core unit with a plurality of peripheral units, said bus interface unit comprising:

a bus cycle arbiter means for arbitrating a plurality of cycle requests inputted from said plurality of units;

a cycle information selecting means for selecting cycle information inputted from said units in response to an arbitration determination of said bus cycle arbiter means;

a cycle storage means for storing selected information;

cycle generating means for generating a bus cycle in response to the information stored in said cycle storage means;

a bus control means for controlling said bus interface unit as a whole; and a write storage means for enabling a next operation without waiting for said core unit to complete its write operation to improve a performance of a memory write cycle wherein said bus interface unit simultaneously processes said bus cycle requests from respective pipelines of said microprocessor during one cycle.

2. A bus interface unit as claimed in claim 1, further comprising:

a snoop control means for checking said internal caches to keep a consistency of internal cache data if a write-back cache is used in said microprocessor.

3. A bus interface unit as claimed in claim 1, wherein a protocol related to said cycle request and acknowledge between said core unit and said bus interface unit is limited to said code cache and said data cache to simplify an interface between said core unit and said bus interface unit.

4. A bus interface unit as claimed in claim 1, wherein said cycle arbiter means sends cycle acknowledge signals with respect to said plurality of cycle requests in accordance with a fixed priority algorithm to arbitrate said plurality of cycle requests accordingly.

5. A bus interface unit as claimed in claim 4, wherein according to said priority algorithm, first to fifth priorities are given to a write back buffer, said cycle storage means, write storage means, data cache, and code cache, respectively.

6. A bus interface unit as claimed in claim 5, wherein priorities of requests of said write back buffer are given in the order of an external snoop write back buffer, an internal snoop write back buffer, and a replacement write back buffer.

7. A bus interface unit as claimed in claim 2, wherein said cycle storage means comprises two entries so as to enable two bus cycles at maximum to proceed simultaneously.

8. A bus interface unit as claimed in claim 7, wherein each of said entries comprising:

a first field for storing an address of a currently proceeding cycle;

a second field representing a size of a currently proceeding operand;

a third field representing that said currently proceeding cycle is a first cycle of misaligned cycles;

a fourth field representing that said currently proceeding cycle is a cycle lying on a boundary of said bus unit;

a fifth field representing a kind of said bus cycle to proceed;

a sixth field for controlling an external cache; and a seventh field representing that a valid cycle is stored in said cycle storage means.

9. A bus interface unit as claimed in claim 7, wherein each of said entries further comprises;

an eighth field representing firstly written one of said two entries; and a ninth field for informing that there exists a discontinued bus cycle.

10. A bus interface unit as claimed in claim 9, wherein said cycle storage means uses said eighth field as pointer means in selecting one of said two entries.

11. A bus interface unit as claimed in claim 1, wherein said bus control means controls said bus interface unit using a finite state machine having six states in accordance with proceeding of said bus cycles requested by first and second pipelines, wherein said six states are a first state where said cycle does not proceed on said bus, a second state where an address and a cycle control signal of a first bus cycle are externally driven, a third state where data transfer of said first bus cycle is actually performed or is waited for, a fourth state where a new second bus cycle proceeds with said first state, while said first bus cycle is in said second state, in response to a control signal in a state where said first bus cycle is not completed, a fifth state where said first and second bus cycles proceed in parallel, and a sixth state where data bus driving is discontinued for at least one cycle for proceeding with said first and second bus cycles.

12. A bus interface unit as claimed in claim 2, wherein said snoop control means controls a snoop operation using a finite state machine having eight states to mate with a bus protocol, wherein said eight states are a first state where a snoop-related operation is not performed, a second state where externally inputted snoop requests are sent to said internal units and their results are received, a third state where a next operation is determined in accordance with said snoop results, a fourth state where a snoop hit for a modified line in said data cache is generated, but proceeding of said write back cycle is waited for, a fifth state where arbitration is performed to proceed with said write back cycle, a sixth state where said write back cycle is proceeding, a seventh state existing after receiving said control signal which represents that said bus cycle is completed and a new bus is prepared, and an eighth state required for waiting for one cycle after receiving said control signal.

* * * * *